United States Patent [19]

Rowan et al.

[11] 4,289,871
[45] Sep. 15, 1981

[54] METHOD TO INCREASE REACTOR CAPACITY FOR POLYCONDENSATION OF POLYESTERS

[75] Inventors: Hugh H. Rowan, Chapel Hill, N.C.; Max B. Mueller, Royal Oak, Md.; Stanley D. Lazarus, Petersburg, Va.

[73] Assignee: Allied Chemical Corporation, Morris Township, Morris County, N.J.

[21] Appl. No.: 134,592

[22] Filed: Mar. 27, 1980

[51] Int. Cl.$^3$ .............................................. C08G 63/18
[52] U.S. Cl. .................................... 528/309; 528/272; 528/483; 528/491; 528/496
[58] Field of Search ............... 528/272, 309, 483, 491, 528/496

[56] References Cited

U.S. PATENT DOCUMENTS

| Re. 24,490 | 6/1958 | Heisenberg et al. | 260/75 |
|---|---|---|---|
| 2,465,319 | 3/1949 | Whinfield et al. | 260/75 |
| 3,018,272 | 1/1962 | Griffing et al. | 260/75 |
| 3,050,533 | 8/1962 | Munro et al. | 260/346.1 |
| 3,054,776 | 9/1962 | Higgins | 260/75 |
| 3,109,833 | 11/1963 | Seiner | 260/75 |
| 3,109,834 | 11/1963 | Seiner | 260/75 |
| 3,110,547 | 11/1963 | Emmert | 18/54 |
| 3,480,587 | 11/1969 | Porter | 260/47 |
| 3,484,410 | 12/1969 | Lazarus et al. | 260/75 |
| 3,522,018 | 7/1970 | Bachmann et al. | 23/285 |
| 3,544,525 | 12/1970 | Balint et al. | 260/75 |
| 3,689,461 | 9/1972 | Balint et al. | 260/75 M |
| 3,701,757 | 10/1972 | Lazarus et al. | 260/75 R |
| 3,714,125 | 1/1973 | Shima et al. | 260/75 M |
| 3,723,391 | 3/1973 | Beer et al. | 260/75 M |
| 3,728,083 | 4/1973 | Greenburg et al. | 23/285 |
| 3,728,309 | 4/1973 | Maxion | 260/75 M |
| 3,756,986 | 9/1973 | Russell | 260/75 M |
| 3,787,370 | 1/1974 | Shima et al. | 260/75 R |
| 3,803,097 | 4/1974 | Lazarus et al. | 260/75 R |
| 3,976,431 | 8/1976 | Boggs et al. | 23/285 |
| 3,984,379 | 10/1976 | Oka et al. | 260/75 M |
| 4,211,858 | 7/1980 | Wada et al. | 528/272 |

OTHER PUBLICATIONS

B. V. Petukhon, The Technology of Polyester Fibres, pp. 18 & 19, (1963).
Jap. Abstract 7210069, 3-72.

*Primary Examiner*—Lucille M. Phynes
*Attorney, Agent, or Firm*—Richard A. Anderson

[57] ABSTRACT

The improvement of passing an inert, preferably vaporizable and condensible, liquid material through or over a polyester molten mass in a polymer reactor to further increase surface area-to-volume ratio and/or lower the partial pressure of vaporous products of condensation so that viscosity of the polymer is increased at a substantially greater rate in the same residence time is taught for the prior art condensation process in a film-forming reactor at temperatures of 275° C. to 300° C., pressures of 0.1 to 760 Torr, and residence times of 0.1 to 6 hours. A polymer having an intrinsic viscosity above 0.65, preferably over 0.7, is produced.

17 Claims, 1 Drawing Figure

METHOD TO INCREASE REACTOR CAPACITY FOR POLYCONDENSATION OF POLYESTERS

BACKGROUND OF THE INVENTION

1. Field of the Invention

This invention relates to a process to prepare film and fiber forming synthetic polyesters. More particularly, it relates to the preparation of the film and fiber forming synthetic polyesters of high viscosity either by direct esterification or interchange of an organic dicarboxylic acid and/or the lower alkyl esters thereof with a glycol having 2 to 10 carbon atoms per molecule to obtain the corresponding diglycol-ester intermediate and then condensing said intermediate in a high surface area-to-volume ratio reactor at temperatures between about 275° C. and 300° C., pressures between about 0.1 and 760 Torr, a residence time between about 0.1 and 6 hours to increase the viscosity of the polymer.

2. Description of the Prior Art

The preparation of linear high-molecular weight polyesters useful in commercial articles either by the ester interchange reaction between dimethyl terephthalate and a polyol or by a direct esterification process wherein a dicarboxylic acid or anhydride is reacted with a polyol is known. U.S. Pat. No. 2,465,319 illustrates initial disclosure of the preparation of poly(ethylene terephthalate), and U.S. Pat. Nos. 3,050,533; 3,018,272; 3,484,410; and 3,689,461 illustrate various improvements thereof.

In general, the direct esterification in the prior art is carried out with the molecular ratio of the acid to the polyol of from about 1.0 to about 1.0–2.0 and preferably in a mole ratio of from about 1.0 to about 1.1–1.7.

High intrinsic viscosity (I.V.) polyester is produced commercially by the use of continuous operation reactors designed to create large polymer surface areas by the use of internal wheels, discs, agitators, etc., and in the prior art by the use of high vacuum to strip the product of condensation, e.g., the ethylene glycol. See U.S. Pat. Nos. 3,728,083 and 3,976,431.

The capability of commercial reactors relative to the maximum viscosity and throughput capacity have been governed by the efficiency of film formation, residence time, temperature, and vacuum. The basic construction of the reactor internals determines the amount of film formation and it is thus essentially fixed except by major capital expenditure. Increased residence time and temperature have been used but are detrimental, as known to anyone skilled in the art, due to degradation reactions increasing as residence or temperature is increased. Improved, higher rate catalysts also have been suggested; see U.S. Pat. Nos. 3,701,757 and 3,803,097.

Thus, to increase the maximum intrinsic viscosity capability and/or throughput capacity, polymerization reactors now operate at very high vacuum. Vacuum levels below 1 Torr are common practice, many reactors operate below 0.5 Torr, requiring the use of large expensive vacuum units such as multi-jet steam ejectors. However, it is not generally known to use inert gas sweep or bubbles at such low vacuum levels. U.S. Pat. No. 3,054,776 teaches use of vacuum below 1 Torr during polycondensation, with inert gas bubbled through the melt; however, only 0.1 to 0.4 I.V. polymer is produced in a low surface area reactor.

SUMMARY OF THE INVENTION

It has been found that, very surprisingly, extremely low levels of vacuum (below 0.35 Torr) are not required to produce a polyester polymer of higher intrinsic viscosity and also that the throughput capacity of an existing reactor may be increased by the controlled injection of an inert preferably vaporizable and condensible liquid material into a typical film forming reactor.

Based on trials with continuous operating reactors, it has been determined that intrinsic viscosity can be controlled utilizing this concept. The mechanism postulated is that given reasonably adequate film formation, reaction rate is controlled by the partial pressure of the vapor condensation product, such as ethylene glycol, which exists in the vapor surrounding the film. In the prior art concept, use of extremely high vacuum (below 0.35 Torr) decreases the total pressure of the system, which is essentially ethylene glycol. In the current invention, the ethylene glycol pressure is reduced by introducing an inert, preferably liquid vaporizable and condensible, nonreactive material to depress the partial pressure of the ethylene glycol, while operating at the same system total pressure.

Initial trials utilizing a partial pressure concept were not totally satisfactory due to the use of inert gases, such as $N_2$, which impose high noncondensible loads on vacuum systems and also detrimental side effects from the small quantities of $O_2$ present in the inert gas. However, $N_2$ can be used to demonstrate the invention (Examples 1 and 5) and is practical if vacuum capability can handle the noncondensible load and sufficiently $O_2$-free inert gas is used.

In the preferred method of this invention, a liquid vaporizable and condensible inert material, which has no effect on the quality of the polyethylene terephthalate produced, is introduced to the reactor (Examples 2, 4 and 5). Since the system total pressure does not change and the inert liquid vaporizable and condensible material can be readily removed prior to the vacuum system (by spray condenser, for example), maximum viscosity and/or reactor throughput (capacity) can be significantly increased at moderate cost.

The prior art process for polycondensation of molten ethylene terephthalate polyesters is a high surface area-to-volume ratio reactor operating at temperatures between about 275° C. and 300° C., pressures between about 0.1 and 760 Torr, and a residence time of between about 0.1 and 6 hours, while continuously removing the vaporous products of condensation in a vapor removal system and increasing the viscosity of the polyester.

The improvement of this preferred invention comprises injecting liquid inert vaporizable and condensible material having an atmospheric boiling point between about 220° C. and 250° C. and solubility parameters in polyethylene terephthalate between about 10 and 16 into the molten polyester at the reaction temperature so that it vaporizes to form vapor bubbles to further increase the surface area-to-volume ratio in the reactor, passing the inert material through the molten polyester and into the vapor removal system, and condensing the inert material in the vapor removal system, so that the viscosity of the polyester is increased at a greater rate in the same residence time, and/or throughput is increased for the same viscosity polymer.

Typical preferred inert materials are 2-pyrrolidinone, methyl salicylate, ethylene carbonate, 1,2-propylene carbonate, o-nitrotoluene, m-dibromobenzene, and 1,2,3-tribromopropane. The most preferred material is ethylene carbonate. The method of this invention will increase the final intrinsic viscosity of the polyester by at least an additional 0.05 unit at the otherwise same operating conditions and residence time. The inert material can be injected into the molten polyester just prior to entry of the polyester into the reactor, or it may be injected into the bottom of the reactor.

Preferably, the inert material is injected in amounts between about 0.2 and 1.5 percent by weight, more preferably, 0.3 to 1.1 percent by weight of molten polyester. In another embodiment of this invention, the liquid inert vaporizable and condensible material described above is added to the vapor space above the molten polyester in the reactor and vaporizes to flow across the molten polyester polymer, then is condensed in the vapor removal system. Preferably, the liquid inert material is preheated before it is added to the vapor space so that it vaporizes instantly upon entry.

In still another embodiment of this invention, inert gases such as nitrogen, carbon dioxide, dioxane, argon, hydrocarbons boiling below 250° C., burner gas or mixtures thereof, all free of oxygen or other reactive material, in addition the liquid vaporizable and condensible inert materials preferred, described above, are used to create a flow of inert gas in a high surface area-to-volume reactor being operated at low vacuum between about 0.35 and 1 Torr, and the other conditions described above to produce a molten polyester polymer having an intrinsic viscosity above 0.65, preferably above 0.9, beginning with a continuously fed molten polyester polymer having an intrinsic viscosity between about 0.4 and 0.6.

The inert material can be added either to create a flowing stream across the vapor space of the reactor or introduced into the molten polyester polymer just prior to entry into the reactor.

Notice that practice of this embodiment, in Example 1, at 0.5 Torr, a typical controllable vacuum level, produced polymer having an intrinsic viscosity of 1.005. The prior art low vacuum process without introduction of $N_2$, only achieved 1.01 intrinsic viscosity polymer from the same beginning polymer and a much lower vacuum which was the minimum obtainable with the vacuum system as shown in Example 3.

DESCRIPTION OF THE PREFERRED EMBODIMENTS

Figure 1:
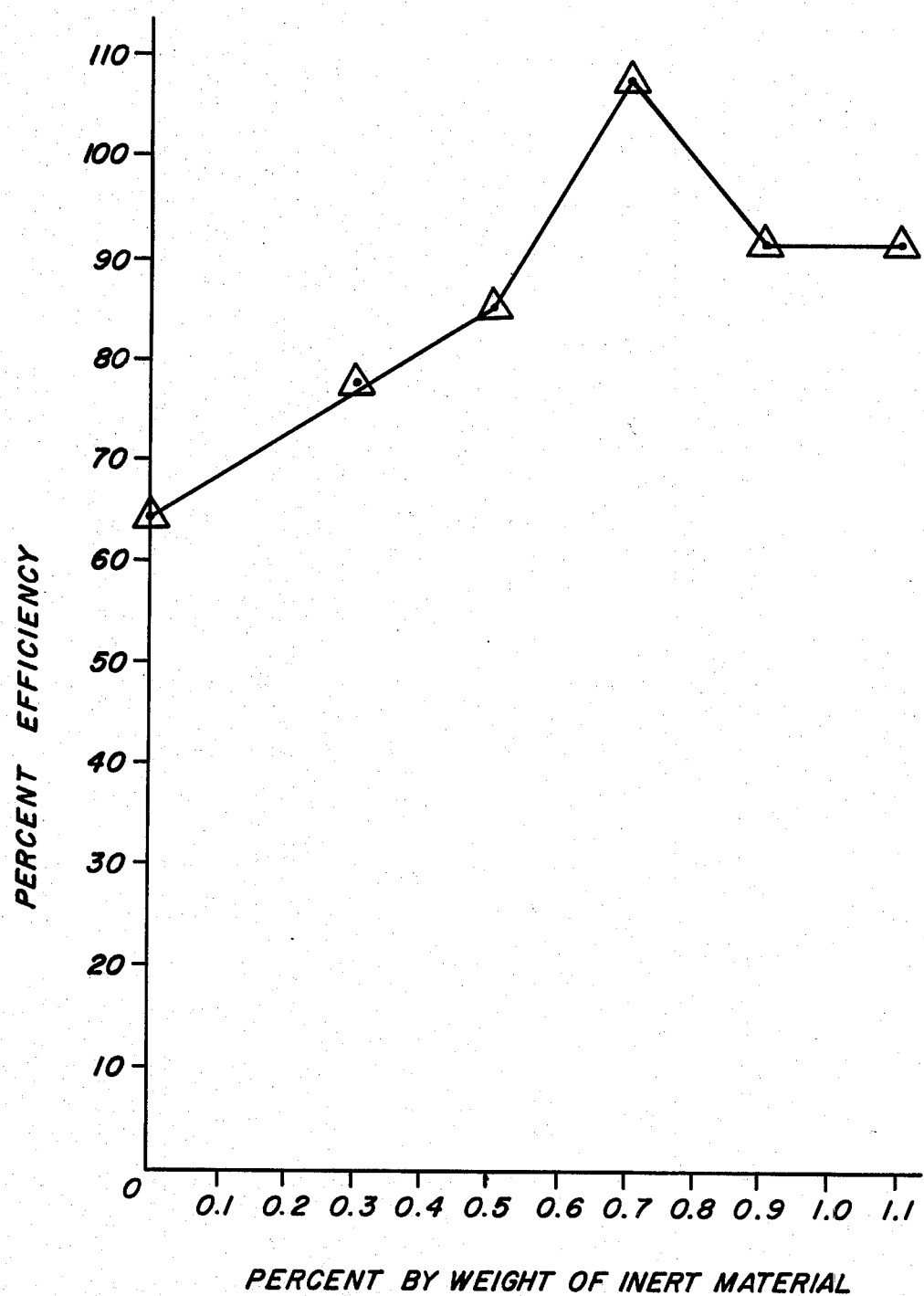

Boiling points and solubility parameters are given for the typical preferred inert vaporizable and condensible liquid materials in Table 1.

TABLE 1

| Nonreactive (to PET) Liquid | Boiling Point, °C., 760 mm. | Solubility Parameters |
| --- | --- | --- |
| 2-Pyrrolidinone | 245 | 14.6 |
| Methyl salicylate | 233 | 10.1 |
| Ethylene carbonate | 248 | 14.7 |
| 1,2-Propylene carbonate | 242 | 13.3 |
| o-nitrotoluene | 232 | 10.4 |
| m-dibromobenzene | 220 | 10.3 |
| 1,2,3-Tribromopropane | 222 | 10.6 |

Solubility parameter $= \sqrt{\frac{\Delta E}{V}} = \sqrt{\frac{\Delta H - RT}{m/d}}$ ;

where
$\Delta E$ is latent or internal heat of vaporization,
$\Delta H$ is total or external heat of vaporization,
R is the gas constant,
T is the absolute temperature,
V is molar volume,
m is molecular weight, and
d is density (g./cc.).

EXAMPLE 1

A disc ring reactor described in U.S. Pat. No. 3,728,083, hereby incorporated by reference, operating continuously at 282° C., 1.5 hours residence time, entering intrinsic viscosity (I.V.) of 0.5, 0.5 Torr, throughput 100 pounds per hour, produced a polyethylene terephthalate having an I.V. of 0.95.

Introduction of 0.6 scfh of $N_2$ to the vapor space results in an increase of I.V. to 1.005 with the same operating conditions of the reactor. Pressure did not change from 0.5 Torr.

EXAMPLE 2

Using conditions in Example 1, except that 0.7 pounds/hour of ethylene carbonate is introduced to the reactor feed line, the I.V. of the polyester increased from 0.95 to 1.07 within one residence time. Vacuum was not changed.

COMPARATIVE EXAMPLE 3

Using conditions in Example 1, reactor pressure is reduced to the minimum achievable with vacuum system. No inert is introduced to the vapor space, or otherwise.

Reactor pressure=0.35 Torr
I.V. achieved—1.01

EXAMPLE 4

Under the same conditions as in Example 1, except instead of $N_2$, various amounts of ethylene carbonate as the inert material were injected into the molten polyester just prior to entry into the reactor. Percent efficiency of the various amounts is shown in FIG. 1. Percent efficiency is:

Theoretical Efficiency $= \frac{I.V.\ Exit\ -\ I.V.\ Inlet}{I.V.\ Equilibrium\ -\ I.V.\ Inlet}$ I.V. Equilibrium = Equilibrium viscosity calculated by the method of Petukhov*

I.V. is measured as solution of 0.32 gram of polyester polymer in 25 ml. of 60 percent phenol and 40 percent sym-tetrachloroethane solvent at 25° C. Note that, at 0.7 percent by weight, efficiency exceeds theoretical at the equilibrium for system pressure.

EXAMPLE 5

The disc ring reactor of Example 1 is increased to maximum throughput using prior art processes by
*Technology of Polyester Fibres, Macmillan, 1963, pp. 18–19. optimizing operating parameters such as temperature, vacuum level, agitator speed and inventory. Maximum sustainable rate is 160 pounds per hour.

Introduction of controlled inert material, either as $N_2$ or the preferred condensible inert, ethylene carbonate, enabled sustainable controlled rate of 205 pounds per hour to be achieved.

PREFERRED EMBODIMENT

The preferred embodiment of this invention herein would be carried out by the process described and in the apparatus and general conditions described in U.S. Pat. No. 3,689,461, hereby incorporated by reference. Also, the preferred final reactor for this process is disclosed in U.S. Pat. No. 3,976,431, hereby incorporated by reference.

We claim:

1. A method to increase the reactor capacity and throughput and/or increase final viscosity of the polyester for polycondensation of molten ethylene terephthalate polyesters in a high surface area-to-volume ratio reactor operating at temperatures between about 275° C. and 300° C., pressures between about 0.1 and 760 Torr, and a residence time of between about 0.1 and 6 hours while continuously removing the vaporous products of condensation in a vapor removal system, and increasing the viscosity of the polyester having an initial intrinsic viscosity above 0.4, comprising:
   a. injecting liquid inert vaporizable and condensible material having an atmospheric boiling point between about 220° C. and 250° C., and a solubility parameter between about 10 and 16 into the molten polyester at said reaction temperature so that it vaporizes to form vapor bubbles to further increase the surface area-to-volume ratio in the reactor, and
   b. passing said inert material through said molten polyester and into said vapor removal system, and
   c. condensing said inert material in said vapor removal system.

2. The method of claim 1 wherein said inert material is selected from the group consisting of 2-pyrrolidinone, methyl salicylate, ethylene carbonate, 1,2-propylene carbonate, o-nitrotoluene, m-dibromobenzene, and 1,2,3-tribromopropane.

3. The method of claim 1 wherein the inert material is ethylene carbonate.

4. The method of claim 1 wherein the inert material is injected into the molten polyester just prior to entry of the polyester into the reactor.

5. The method of claim 1 wherein the inert material is injected into the bottom of the reactor.

6. The method of claim 1 wherein the inert material is injected in amounts between about 0.2 and 1.5 percent by weight of molten polyester.

7. The method of claim 1 wherein the inert material is injected in amounts between about 0.3 and 1.1 percent by weight of molten polyester.

8. A method to increase the reactor capacity and throughput and/or increase polyester final viscosity for polycondensation of molten ethylene terephthalate polyesters in high surface area-to-volume ratio reactor operating at temperatures between about 275° C. and 300° C., pressures between about 0.1 and 760 Torr, and a residence time between about 0.1 and 6 hours while continuously removing the vaporous products of condensation in a vapor removal system and increasing the viscosity of the polyester having an initial intrinsic viscosity above 0.4, comprising:
   a. adding a liquid inert vaporizable and condensible material to the vapor space above the molten polyester in the reactor, said inert material having an atmospheric boiling point between about 220° C. and 250° C. and a solubility parameter between about 10 and 16 to vaporize and lower the partial pressure of the vaporous products of condensation in the reactor vapor space, and
   b. condensing said inert material in said vapor removal system.

9. The method of claim 8 wherein said inert material is selected from the group consisting of 2-pyrrolidinone, methyl salicylate, ethylene carbonate, 1,2-propylene carbonate, o-nitrotoluene, m-dibromobenzene, and 1,2,3-tribromopropane.

10. The method of claim 8 wherein said inert material is ethylene carbonate.

11. The method of claim 8 wherein said inert material is injected in amounts between about 0.2 and 1.5 percent by weight of molten polyester.

12. The method of claim 8 wherein the inert material is injected in amounts between about 0.3 and 1.1 percent by weight of molten polyester.

13. In a method for producing molten ethylene terephthalate polyesters having an intrinsic viscosity above 0.65 in a high surface area-to-volume ratio reactor operating at temperatures between about 275° C. and 300° C., pressures between about 0.35 and 1 Torr, and a residence time between about 0.1 and 6 hours, continuously feeding molten polyester polymer having a viscosity between about 0.4 and 0.6, and continuously removing the products of condensation and increasing the viscosity of the molten polyester polymer, the improvement comprising creating a flow of inert gas through said reactor so that the viscosity of the polyester is increased at a greater rate in the same residence time, and/or capacity and throughput of the reactor is increased.

14. The method of claim 13 wherein the polymer produced has an intrinsic viscosity above 0.7.

15. The method of claim 13 wherein the inert gas is introduced into the molten polyester polymer just prior to entry into the reactor.

16. The method of claim 13 wherein the inert gas is introduced to create a flowing stream across the vapor space of said reactor.

17. The method of claim 13 wherein the inert gas is introduced into the bottom of the reactor.

* * * * *